Jan. 12, 1954
C. V. CARLSON ET AL
2,665,739
MACHINE FOR MANUFACTURING HOLLOW BODIES
FROM THERMOPLASTIC SHELL MEMBERS
Filed Feb. 26, 1951
4 Sheets-Sheet 1
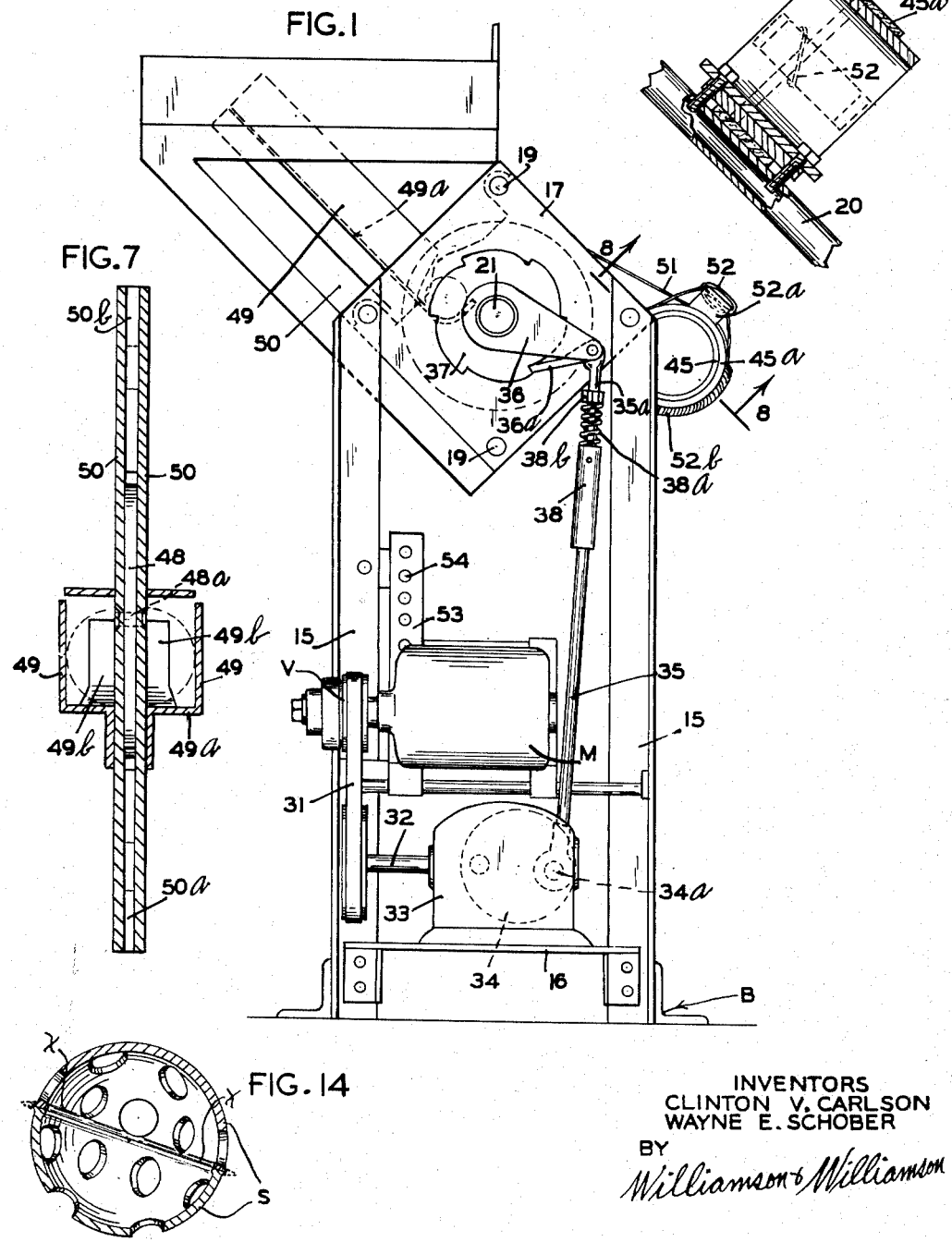
INVENTORS
CLINTON V. CARLSON
WAYNE E. SCHOBER
BY
Williamson & Williamson
ATTORNEYS

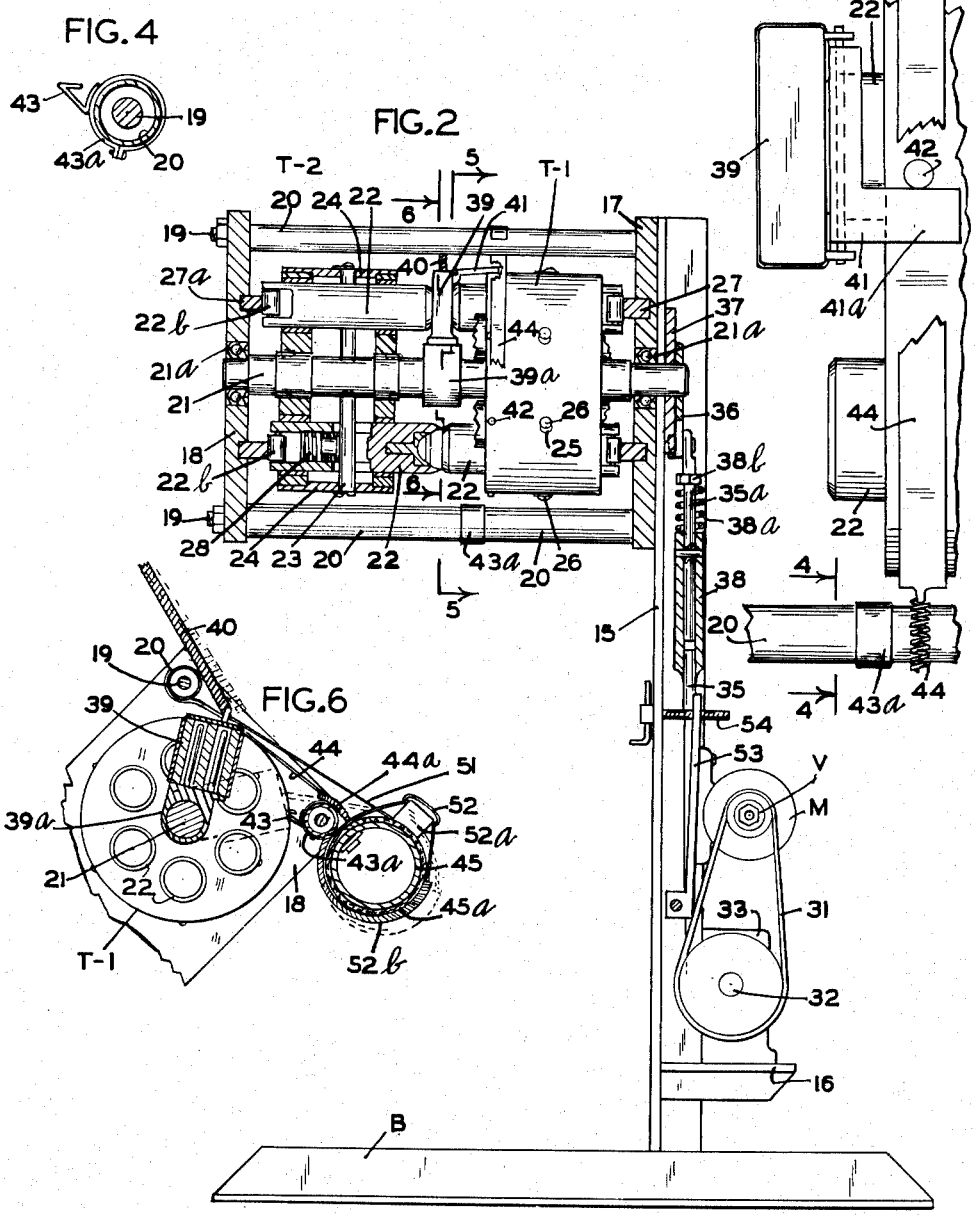

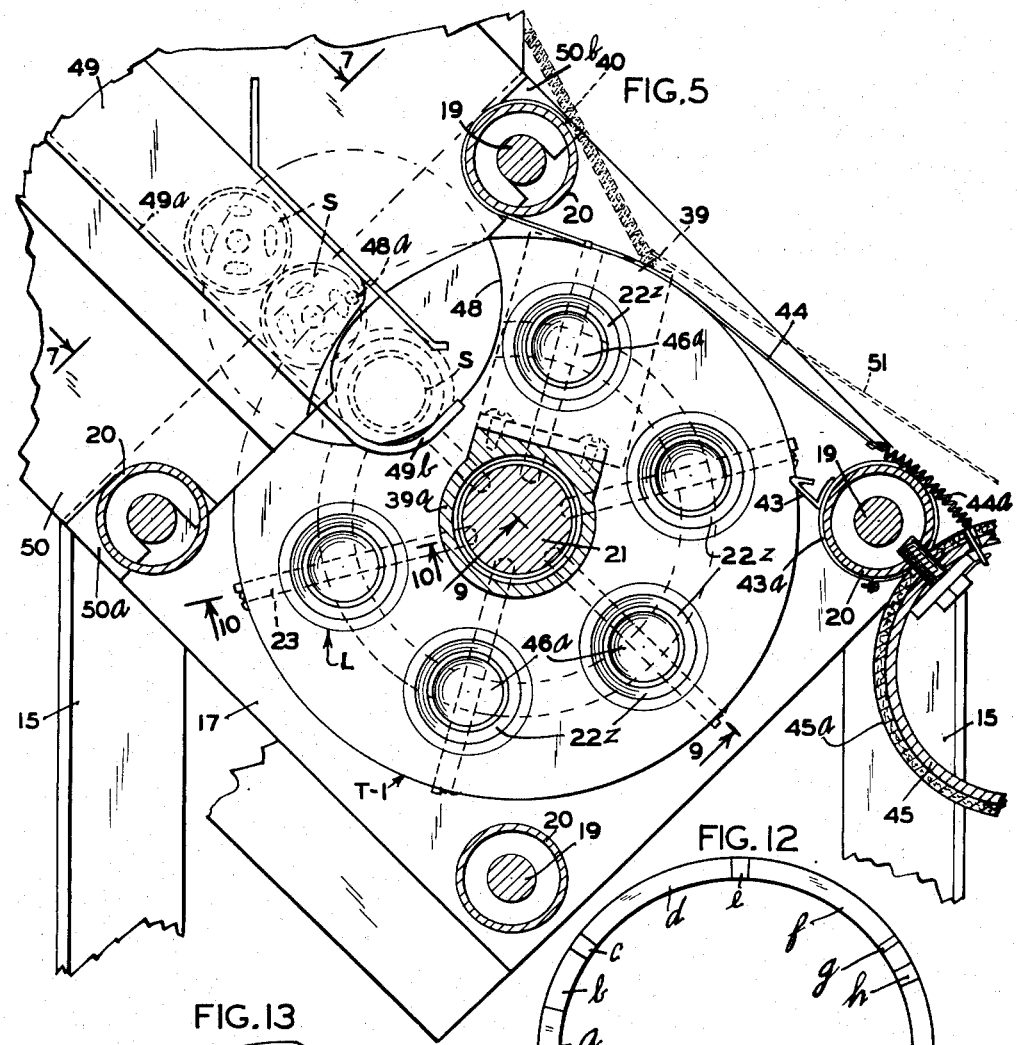

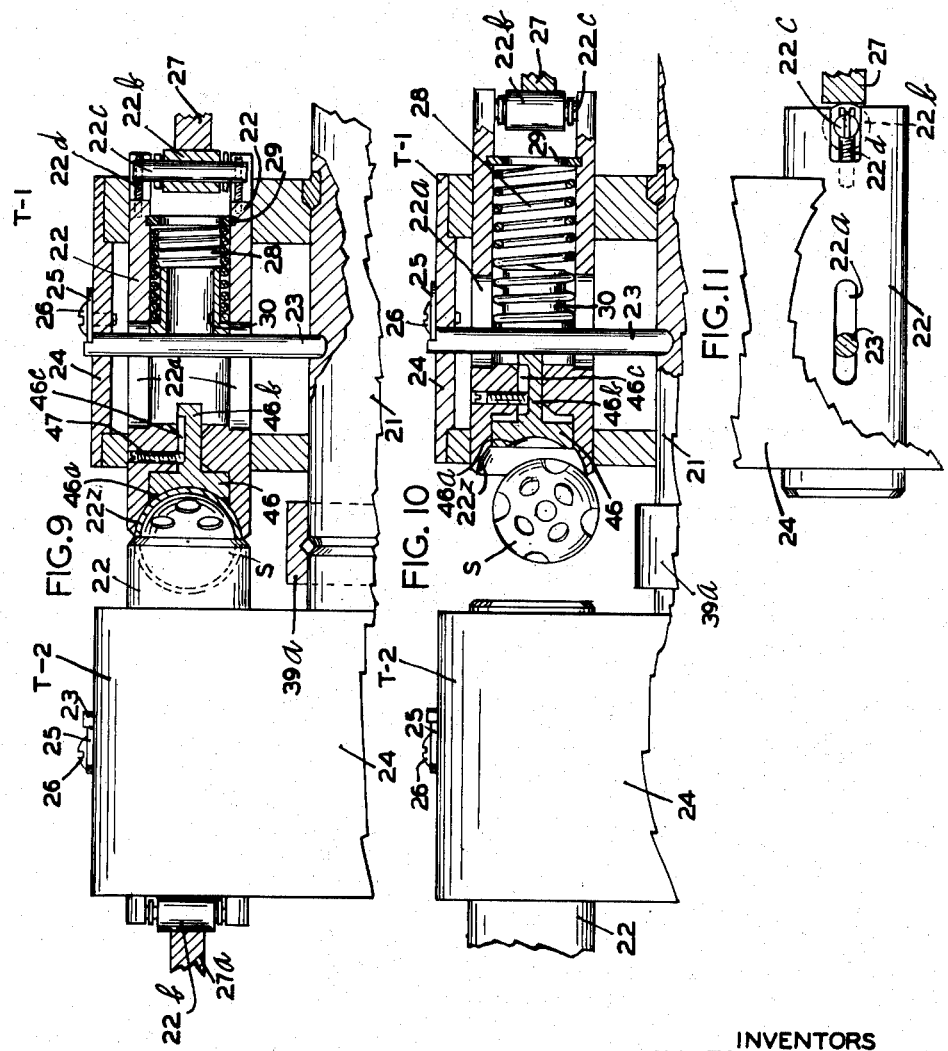

Patented Jan. 12, 1954

2,665,739

UNITED STATES PATENT OFFICE 2,665,739

MACHINE FOR MANUFACTURING HOLLOW BODIES FROM THERMOPLASTIC SHELL MEMBERS

Clinton V. Carlson and Wayne E. Schober, Minneapolis, Minn., assignors to Cosom Industries, Inc., Minneapolis, Minn., a corporation of Minnesota Application February 26, 1951, Serial No. 212,814

12 Claims. (Cl. 154—42)

This invention relates to the manufacture of hollow bodies such as spheroids, bottles, casings and containers from thermoplastic materials and particularly to the art and apparatus or machinery for forming an integrated hollow body or article from a pair of thermoplastic shell sections having substantially similar edges which may be brought together in registration and welded or fused.

It is an object of our invention to provide a commercially successful, high capacity machine or apparatus for receiving previously molded shell sections in pairs and for automatically handling, treating and welding together, pairs of said sections to form integrated hollow bodies therefrom.

Another object is the provision of an automatic, high capacity machine for joining together in integral form, successively fed pairs of opposed, hollow thermoplastic shells and in so doing, efficiently heating the opposing similar edges of said shells and thereafter, in sequence, bringing said edges together to uniformly fuse said edges and thereafter, retaining said relation until the weld has completely set and hardened and then dropping or ejecting the completed articles.

Another object is the provision of an improved method of manufacturing thin, hollow and durable plastic bodies which eliminates the need for "blowing apparatus," mold cores or inflation and which will produce substantially uniform products at high speed.

These and other objects and advantages of our invention will be more apparent from the following description made in connection with the accompanying drawings wherein like reference characters refer to similar parts throughout the several views and in which:

Fig. 1 is a side elevation of an embodiment of our invention adapted to integrally join pairs of thermoplastic, semi-spheroid shell sections together to form integral hollow balls;

Fig. 2 is a view partly in front elevation and partly in vertical section with some portions broken away showing two sets of the shell holding and manipulating members in the respective positions of heating opposed shell edges and retaining the shells after fusing of the edges together;

Fig. 3 is a fragmentary top plan view showing the relation of the heating plate and mechanism for advancing the same with the turrets and for subsequently releasing the plate for retraction to starting position;

Fig. 4 is a detail cross section taken on the line 4—4 of Fig. 3 showing the plate-releasing cam;

Fig. 5 is a vertical section taken on the line 5—5 of Fig. 2;

Fig. 6 is a vertical cross section taken on a somewhat smaller scale along the line 6—6 of Fig. 2 showing the cushioning and snubbing means for controlling the return of the heating plate to starting position.

Fig. 7 is a cross section taken on the line 7—7 of Fig. 5;

Fig. 8 is a detail section taken on the line 8—8 of Fig. 1;

Fig. 9 is a view taken partially in plan and partially in radial section showing one of the turrets in full and one in section and with the shell-holding members protracted in position to maintain in registration, for welding, the melted edges of a pair of opposing shells;

Fig. 10 is a similar view in partially plan and partially radial section showing the extreme opening position of a pair of cooperating shell-holding pistons;

Fig. 11 is a fragmentary top plan view with some portions broken away showing the slot and pin mounting of one of the pistons and the adjustment for the cam roller at the outer end thereof;

Fig. 12 is an elevation showing the camming track at one of the ends of the stationary turret frame; and Fig. 13 is a diagrammatical view to show how said camming track is constructed to actuate the shell-holding pistons in accordance with the machine disclosed.

Fig. 14 is a cross-section of a hollow body of two fused shells showing a uniform annular bead formed on the internal and external walls of the shells.

The embodiment of the invention disclosed is a machine or apparatus for automatically completing the manufacture of hollow spheroids constructed from pairs of previously molded semi-spherical shell sections of thermoplastic material. The shell-holding and manipulating elements thereof are thus conveniently formed in the shape of cylindrical pistons with sockets at the inner ends thereof for appropriately seating and nesting the respective shells. It will of course be understood that our invention is equally applicable for completing the manufacture of and very efficiently welding together into an integrated structure pairs of shells of various shapes and forms to provide for production of many types of hollow bodies, casings such as flexible and inflexible plastic bottles and containers, hollow coverings of various types, dolls, figures and the like.

In the embodiment of the invention illustrated, the working mechanism of our machine is mounted for bodily rotation upon a horizontal axis and equipped with mechanical means for progressive or step by step rotation. A suitable upstanding supporting standard rigidly affixed at its lower end to a wide base B is utilized, said standard comprising as shown a pair of vertical, heavy, parallel angle bars 15 suitably reinforced and braced at their lower ends by a transverse platform and bracing structure 16 and interconnected and reinforced at the upper ends thereof by a heavy, rectangular metal plate 17 which constitutes one of the rigid ends of a turret mounting or frame.

A similar heavy metal plate 18 forms the opposite end of the turret mounting and is rigidly connected with and supported from plate 17 by means of a series, as shown four rigid tie rods 19 which are concentrically disposed within appropriate spacer tubes 20 interposed between the ends of the plates 17 and 18. In the embodiment illustrated it will be noted that the edges of the rectangular plates 17 and 18 are disposed diagonally to the horizontal.

A heavy turret shaft 21 forms turret trunnions at the ends thereof which are respectively journaled in suitable bearings 21a at the diminished ends thereof, said bearings being centrally disposed of the respective end plates 17 and 18. A pair of turrets, designated as entireties by the indicia T-1 and T-2 are fixed in spaced relation to the end plates 17 and 18 and in relatively widely spaced relation to each other upon turret shaft 21.

Each of said turrets carries a plurality of shell-holding and manipulating members as shown, in the form of elongated pistons 22, as shown, six in number, which are circumferentially arranged upon the respective turrets and mounted in suitable slide bearings for horizontal reciprocation. The pistons 22 for both turrets in the form of the invention disclosed are identical and are therefore similarly numbered and are arranged on the two turrets T-1 and T-2 to correspond in pairs and are axially aligned in pairs. The internal structure of said pistons 22 and the mountings and the actuating means therefor may be readily understood from Figs. 9 to 11 of the drawings, each of said pistons being for the most part, tubular and open ended and having diametrically disposed longitudinal slots in the medial portions thereof for accommodation for each piston of a heavy, rigid guiding and abutment pin 23, the inner end of which in each instance, is rigidly and firmly secured within a suitable radial socket provided in the turret shaft 21. The outer ends of the radial pins 23 extend through the cylindrical casings 24 of the turrets T-1 and T-2 and as shown, are retained against longitudinal displacement by removable means such as heavy washers 25 which are removably secured to the periphery of the turrets by such means as the bolts 26. The edges of the respective washers as shown, engage rabbeted portions in the outer ends of radial pins 23. Each of the pistons 22 is provided at its outer end with a diametrically disposed cam roller 22b, as shown, journaled upon an adjustable cam roller shaft 22c which is accommodated at its ends in longitudinal diametrically disposed slots formed in the end portions of the pistons. For adjustment of said cam rollers 22b, a pair of screws 22d are provided for the ends of each shaft 22c, said screws at their inner ends being received in small sockets provided in the appropriate portions of the end of the related piston and threadedly engaging tapped sockets in the ends of the respective cam roller shafts 22c. A profile, annular cam track 27 (and 27a respectively) is fixed to each of the ends 17 and 18 of the turret frame having a contour as is diagrammatically illustrated in Fig. 13 and positioned to be at all times engaged by the respective cam rollers 22b of the set of pistons reciprocably mounted in the respective turrets T-1 and T-2. The pistons 22 are at all times urged outwardly towards retracted position by means of coil springs 28 which fit with clearance within the outer ends of the pistons and which are interposed between split removable abutment rings 29 positioned just inwardly of the slotted ends of pistons 22 and annular shoulders provided by the outturned flanges of tubular collars 30. Collars 30, as shown, are nested within pistons 22 with the outturned flanges loosely fitting the interior of the pistons and with the diminished cylindrical portions concentrically disposed with relation to the pistons for accommodation of the forward or inner portions of the respective coil springs 28. The projecting or higher portions of the cam tracks 27 thus cause the respective pistons to be protracted inwardly against the tensioned coil springs 28. Cam tracks 27 and 27a fixed to the two ends of the turret frame are necessarily of opposite characteristics in the form of the invention disclosed, to produce precisely similar reciprocations and functions of the two sets of shell holders or pistons 22 carried by the two turrets T-1 and T-2.

The rotor formed by the heavy turret shaft 21 and the two turrets fixed thereto, is progressively rotated by suitable power mechanism, as shown, being mounted on the upright standard 15 of the machine. To this end, a source of power such as an electric motor M is on the vertical portion of the frame, driving by endless V-belt 31 as shown, a short horizontal shaft 32 which at its inner end carries a gear, not shown, intermeshed with gears within a transmission housing 33. The transmission housing contains a journaled power takeoff disc 34 which has eccentrically connected therewith through a crank pin 34a, an upwardly extending pitman 35. The lower end of said pitman works through a suitable slot in the top of the transmission housing. The upper end of the pitman 35 is pivotally connected with a pawl-carrying arm 36 which is rotatably mounted upon one end of the turret shaft 21. A ratchet disc 37 is also affixed to said end of turret shaft 21 lying concentric with the arm 36. The arm 36 adjacent its outer end has pivotally connected therewith, an inwardly projecting pawl or tooth 36a which is normally urged by torsion spring or the like towards the longitudinal center line of arm 36. Thus reciprocation of the pitman 35 will produce, step by step, rotation of the shaft 21 and of course, the turrets fixed to said shaft. The ratchet wheel, as shown, is provided with a number of teeth similar to the number of shell-carrying members or pistons 22 provided in each of the turrets. The pitman 35 has a lost-motion, spring-equalizer as shown, in the upper portion thereof consisting in a sleeve 38 fixed to the upper portion of the elongated section 35 of the pitman and having mounted in the upper end, the short section 35a of the pitman with freedom for limited longitudinal movement relative to said sleeve. A coil spring 38a surrounds the upper section of the pitman and is interposed between the upper end of sleeve 38 and an adjustment nut 38b threadedly secured to the upper pitman section 35a.

For the purpose of heating and melting the opposing edges of pairs of shells to make possible subsequent welding of the opposed pairs into an integrated hollow body we provide a heating plate or block 39 mounted for oscillation upon the medial portion of the turret shaft 21. The heating plate 39, as shown, is of rectangular block form having electrical heating elements suitably embedded or mounted within the interior thereof. The said plate 39 is rigidly affixed to a mounting collar 39a which is journaled upon the medial portion of turret shaft 21. A coil spring 40 applies torque to heating plate 39 in a counterclockwise direction as viewed in Figs. 5 and 6, having as shown, its lower end affixed to the outer end of the heating plate and having its upper end suitably affixed to the turret frame at a point above and forwardly of the full line position of the heating plate shown in Fig. 6. The heating plate 39 in the form of the invention disclosed is adapted to move with the turrets from the dotted position shown in Fig. 5 through an arc of approximately 55° to the dotted line position of Fig. 6, being carried by one of the turrets through such rotative travel and then being released and returned by the spring 40 to starting position shown in dotted lines in Fig. 5. To actuate the heater plate through its rearward swinging we provide suitable means such as an L plate 41 hinged along its longitudinal edge (see Figs. 2 and 3) to the upper portion and one side of the heating plate and having the base arm 41a of the L normally disposed in horizontal position to be engaged by any one of a series of circumferentially spaced, actuating pegs 42 which are fixed to the periphery of one of the turrets T-1. Pegs 42 correspond in number with the number of pistons or shell holders 22 carried by each of the turrets. In the progressive rotation of the turret T-1 an actuating peg 42 engages the forward edge of the L arm 41a thereby swinging the heating plate from its starting position to the desired point of travel where L arm 41a is released as shown, by a riding cam action over a wedge cam 43 mounted in its arc of travel (see Figs. 3 and 4). The wedge cam 43 as shown, is fixed to a bracket 43a which is welded or otherwise rigidly secured to the rear spacing collar 20 of the turret frame and disposed medially thereof in position to engage the outer portion of the L arm 41a. To positively prevent disengagement of the L arm from the actuating pegs 42 we prefer to provide a flexible retaining element such as a steel ribbon 44 which extends from the underside of the uppermost spacing sleeve 20 of the turret frame just above the periphery of the turret T-1 for a short arc and then extends substantially tangential to the turret and is yieldingly connected by a spring 44a at its rear end with a fixture in the form of a rigid cylinder 45 secured to the rear portion of the rear spacing tube 20.

We provide mechanism at the forward and central portion of the machine for receiving the shells in pairs from suitable manually or automatically operated feeding mechanism and for progressively grasping the shells and nesting the same in the shell forms or holders provided at the inner ends of the reciprocable pistons 22.

In the embodiment of our machine illustrated the inner ends of the several sets of cooperating pistons 22 are provided with semi-spherical seats comprising as shown, concave spherical zones 22a formed internally of the pistons proper and concave sphere segments 46a provided by the outer faces of seat forming and ejecting members 46 slidably related with the inner portions of pistons 22 and axially aligned therewith. The ejector members 46 have heads of circular shape fixed to stems 46b which slide in suitable slide bearings formed in the thickened forward intermediate portion of pistons 22. Movement of the ejection and nesting members 46 is restricted by connection of a set screw pin 47 threaded radially through the piston wall and having its inner end accommodated in a longitudinal slot 46c provided in each of the stems 46b. The end of the stem 46b is positioned for abutment against the radial motion limiting pin 23 for each piston to cause relative projection of the ejector member 46 as shown in Fig. 10, when the piston, through cam operation, is retracted.

The simultaneous grasping, aligning and nesting of the shell members in pairs presented an intricate problem and was solved in the embodiment of the invention illustrated by the combined upward movement of a pair of the cooperating, opposed piston members 22 of the turrets with the simultaneous projection of the opposed ends of the cooperating pistons against a rotary base disc 48 (see Fig. 5) interposed between axially aligned ends of the cooperating pistons at the proper area in the progressive revolution of the turrets. Base disc 48 as shown, is freely pivoted on a horizontal center 48a, the axis being disposed at a point above the centers or axes of the two series of shells which slide downwardly through declined tracks 49 fixed to the forward portion of the machine. As shown, the bottoms of tracks 49 extend at angles approximating 45 degrees to the vertical.

The bottoms of the tracks 49a project some distance beyond the outer side walls and are upturned at their extremities, as shown in Figs. 5 to 7 to form narrowed, shell-retainer arms 49b. Central partitioning means must of course be provided between the longitudinal passages or chambers formed by the opposing guides 49 wherein opposed shells are fed and to this end we provide as shown in Fig. 7, a pair of generally rectangular plates 50 spaced apart in parallel relation by spacer elements 50a at their lower ends and spacer elements 50b at their upper ends. The disc 48 is journaled to freely rotate between plates 50 in the central and forward portion thereof. The forward and lower edges of plates 50 terminate generally on a line slightly overlapping the outer portion of the orbit of the shell holding pistons and said edges are cut away at their medial portions as shown in Fig. 5, to expose the entire peripheral surfaces of a pair of opposed shell members retained by the upturned arms 49b of the tracks. It is extremely important that a very precise cupping movement take place between the nesting forms or sockets at the inner ends of the respective pairs of shell holding pistons 22 and the shells to be picked up and retained in order that injury or crimping of portions of said shells be obviated. Thus, in the embodiment illustrated in the progressive revolution of the rotor and reciprocations of the pistons 22 ejection of completed and cured hollow bodies in fully open or retracted position of the pistons 22 (see Fig. 10) takes place just prior to the next shell-grasping and cupping step in the cycle. The two pistons which have just been simultaneously retracted to eject then are moved inwardly by the high surfaces of the cam members 27 and 27a, this projection of the pistons being synchronized with the upward travel of the said pair of pistons (see Fig. 5) to perfectly cup and nest the pair of opposed shell members retained by the upturned arms 49b, pressure being applied to force the said shell members into the semi-spherical sockets through the medium of the rotary base disc 48. The circular edges of the shells in such action are pressed against the flat surface of the disc, thereby perfectly aligning the axes of the shells with the semi-spherical sockets of the pistons and due to the flexibility and elasticity of the plastic material of the shells, the same are snugly wedged and perfectly seated during this step of the cycle whereafter through the other steps of the cycle they are retained in the forms or sockets.

A simple means for properly mounting the plate and guide track assembly and disc is utilized in the embodiment illustrated by notching the lower spacer members 50a to snugly embrace the appropriate tie rods 19 of the turret frame.

Referring again to the steps in the cycle of operation where a pair of opposed shells nested in the pistons 22 are initially retracted to by-pass and accommodate the leading edge of the heater plate 39 and thereafter, are projected to engage said plate and move with said plate through a predetermined arc, it is desirable that efficient mechanism be provided for thereafter cushioning the returned swinging of the heater plate when it is released from driving engagement and returned to starting position by the spring 40. We provide suitable means in the form of a cushioning and equalizing mechanism comprising a wire filament 51 or other non-stretchable flexible element connected at its forward end with the attachment means for the lower and forward end of spring 40 and wrapped in snubbing relation for one convolution around a leather or other soft covering 45a affixed to the periphery of the cylindrical fixture 45 (see Figs. 1 and 5). The free or outer end of the filament 51 then passes beneath an elastic ribbon such as a rubber band or the equivalent 52 affixed to a bracket 52a and its extremity is connected as shown by a small coil spring 52b with the cylindrical fixture 45.

As shown, the motor M is provided in its armature shaft with a conventional type of variable speed pulley mechanism V which drives the belt 31. The base of motor M as shown in Figs. 1 and 2 is adjustably connected with an adjustable bracket plate 53 which is pivoted at its lower end as shown, to the upright frame between standards 15. An adjustment screw 54 threadedly engages a tapped aperture in the upper portion of bracket 53 and as shown, may be manipulated by a crank handle at the opposite end thereof, to vary the positional relationships between the axes of motor M and the axis of the driven shaft 32 of the transmission mechanism.

The construction and profiles of the piston actuating cam tracks 27 and 27a may be best described in connection with the operation of our machine.

*Operation*

The operation of our machine may best be followed by reference to sheet III (Figs. 5, 12 and 13) of the drawings.

The cycle of operation starts with the loading step which directly follows ejection of a completed, integrated and cooled hollow body. In the position of the cooperating, shell-holding pistons indicated by the letter L in Fig. 5 ejection of a completed body has just been effected and for a short arc of approximately 20°, two opposed pistons involved remain in retracted position during travel of the respective cam actuated rollers 22b over the depressed circular segments a of the cam tracks. Immediately thereafter, cupping action of the piston sockets over the respective shells S held by the retaining arms 49b begins. During this loading period, the cam-actuated rollers 22b pass over the inclined sections b of the cam tracks 27 and 27a causing simultaneous projection of the two cooperating pistons during the progressive movement of the rotor, producing the nice cupping action of the shells previously described and simultaneously pressing the planar, annular edges of the shells against the base disc 48 and in the next progressive rotation of the turret, causing the seated shells to slip off of disc 48 with such action facilitated by free rotation of the disc. Immediately thereafter, during the next step of revolution, the cooperating pair of holding pistons 22 are very suddenly retracted, carrying the opposed shells by the sharply depressed, very short section c of the camming tracks (comprehending rotative arc approximating about 3°). The revolution of the turrets continues with the shells spaced apart to accommodate the heating plate 39 and when the shells are positioned approximately centrally of the heating plate just beyond the position shown in Fig. 5, revolution of the turrets momentarily is stopped and then begins with the cam-actuated rollers of the pistons passing over the rather steep but short incline e of the cam tracks to thereby quickly cause engagement of the edges of the opposing shells against the heating plate and immediately thereafter, connection of the turret T-2 through the appropriate driving peg 42 with the L lever 41 affixed to the heating plate. The heating plate and turrets then revolve through the heating cycle (approximately 50°) during which time the shells are in engagement with the very smooth, non-adhesive surfaces of the plate and softening of the plastic edges of the shells and partial melting takes place. A portion of the cam track responsible for the positioning of the pistons during such zone is indicated by the letter f. Thereafter, rather sudden, short retraction of the two opposing shells takes place as the respective cam rollers ride over a short decline, section g of the cam tracks, and immediately upon start of such retraction and almost simultaneously therewith, the heating element 39 is released by outward wedging action of the element 43 against the underside of the L arm 41a of the heater connection lever, tension spring 40 returning the heating element to the normal position shown in dotted lines in Fig. 5. During such spring-actuated return, the final movement thereof is cushioned and snubbed by the balancing action of filament 51 and the snubbing action of the outer convolution of said filament about the leather washer 45a with the attendant cooperation of the terminal spring 51a securing the extremity of the filament to the cylinder fixture 45. The resiliency of elastic element 52 is also a factor to produce proper cushioning and to eliminate slap or vibration in the final returning movement of the heating plate.

After the release of the heating element and slight retraction of the edges of the two shells, the said pistons are next rather rapidly and simultaneously projected throughout a rather short arc and inclined portion $h$ of the camming tracks, bringing the opposed melted edges of the shells into contact with inward pressure applied uniformly and axially of the two shells to produce sealing. The said pressure results in formation of a uniform annular bead $x$ (see Fig. 14) on the internal wall of the hollow body formed and tends to form a similar bead on the external wall. The inner ends of the pistons 22 are however formed to afford annular cutting or scoring edges where the spherical seats substantially merge with the external cylinders and these edges of opposed piston members are related during the sealing operation to scrape and score the displaced plastic material extruded in annular shape of the exterior of the body formed so that the excess may be readily wiped off or removed after the weld or fusion of the edges is completed and the shells are cured and cooled.

The shells are held in the joined, sealed relation through a relatively large arc or cycle of the operation approximating 172° in the machine disclosed, during which time the cam rollers ride over the long, arcuate, raised portion of the cam tracks $i$ preparatory to the ejection step.

After the shell-contacting, sealing, welding and cooling steps wherein the opposing edges of the shells are held together, the completed, integrated hollow body is ejected during a relatively short arc approximating twenty percent of the revolution of the turret frame. In such ejection, the cooperating pistons 22 are retracted fairly rapidly through the action of the declined sections $j$ of the cam tracks 27. This retraction, it will be noted, causes movement of the pistons 22 from the extreme inward position to substantially the extreme retracted positions of the sections $a$ of the cam tracks. In such retractive movements the ejection stems 46$b$ of the heads 46 after initial movement, are caused to be protruded relatively to the pistons 22 to loosen the hollow body from its holding forms.

From the foregoing description it will be seen that a very perfect fusing or integrating of the respective shell sections is accomplished with the utilization of our machine and method. The shell sections are nested for precise alignment, thereafter heated and melted to the requisite degree at their opposed edges and then almost immediately heat is withdrawn and the opposing edges are forced together in a precise manner. The pressure is retained through the cooling operation with the result that the manufacture of hollow articles is substantially completed through automatically controlled apparatus.

It will of course be understood that various changes may be made in the form, details, arrangement and proportions of the parts without departing from the scope of our invention.

Where in the appended claims, the term "shell members" is utilized, it is comprehended that such term includes open ended or tubular shells and various pieces having walls of concavo convex structure which when united in pairs, provide a hollow, closed or unclosed body.

What we claim is:

1. Apparatus for manufacturing thin hollow bodies from a pair of thermoplastic shell members which have complementary edges adapted to be brought into registration, having in combination a mounting, at least a pair of cooperating shell holding members supported on said mounting and connected thereto for movement together and apart, said shell holding members having means for precisely retaining shells of predetermined shape with open ends thereof in opposed relation for registration, mechanism for moving said shell holding members together and apart under control, a heating plate supported upon said mounting and connected for relative movement transversely to the movements of said shell holding members apart and together and positioned to be interposed between the opposed edges of shells in said holding members when said members are spaced apart.

2. Apparatus for fusing together to form an integral hollow body the substantially similar edges of pairs of thin shell members constructed of thermoplastic material, said apparatus having in combination a mounting, at least a pair of shell holding and manipulating members connected with said mounting in opposed relation for movement together and apart, said members having means for retaining a pair of said shell members with similar edges in opposed predetermined relation for registration, actuating mechanism for said members adapted to move the pair apart or together under control, a heating plate supported from said mounting, and having connections therewith which are effective to produce relative movement between said plate and said holding members in a direction transversely of the relative movements between said holding members, said plate being mounted for interposition between said holding members and between opposing edges of shells carried thereby and control mechanism for controlling said actuating mechanism in sequence to draw said members apart, position said heating plate between said members when drawn apart, move said members together to cause shells carried thereby to respectively contact the heating surfaces of said heating plate, to thereafter draw said members apart and to thereafter move said members together with the fused edges of said shells in contact and to retain said shells in contact until complete fusion and welding has occurred.

3. Apparatus for fusing together complementary edges of a pair of plastic shells to form an integral hollow body, said apparatus having in combination a mounting, a carrier medium connected with said mounting for movement through a predetermined course, a plurality of cooperating pairs of shell holding members mounted in spaced relation upon said carrier medium and connected therewith for relative movement together and apart, said members having means for retaining a pair of shells with their complementary edges disposed for registration, power-driven mechanism for moving said carrier medium through said course, a heating medium supported in respect to said carrier medium for interposition between the several pairs of cooperating shell holding members during one step in the cycle of travel of each cooperating pair and mechanism synchronized with the travel of said carrier medium to successively move said shell holding members into retracted spaced position, thereafter to move said members together in relation to said heating medium, to thereafter move said members together after travel of said respective shell members beyond the positioning of said heating medium to cause the complementary heated edges of said shells to contact and to retain said shells in contact thereafter until complete fusion and cooling has occurred.

4. Apparatus for fusing together complementary edges of a pair of plastic shells to form an integral hollow body, said apparatus having in combination a mounting, a carrier medium connected with said mounting for movement through a predetermined course, a plurality of cooperating pairs of shell holding members mounted in spaced relation upon said carrier medium and connected therewith for relative movement together and apart, said members having means for retaining a pair of shells with their complementary edges disposed for registration, camming mechanism operative upon at least one of the holding members of each of said pairs in response to movement of said carrier medium to successively retract said shell holding members into a spaced relationship, then move said pairs together, then again retract said pairs at least slightly and thereafter again move said pairs more closely together to cause complementary edges of a pair of shells held thereby to be abutted and forced together and power-driven mechanism for moving said carrier medium through said course and means associated with said shell holding members for ejecting shells at the completion of a cycle.

5. Apparatus for fusing together complementary edges of a pair of plastic shells to form an integral hollow body, said apparatus having in combination a turret mounting, a pair of axially aligned, spaced turrets journaled in fixed relation for revolution in said mounting, a plurality of circumferentially spaced shell holding members mounted in each of said turrets and corresponding in number, said sets being correspondingly opposed and being mounted in said turrets for relative movement together and apart, said shell holding members each having means for retaining a shell with an edge thereof disposed substantially in a plane to which the axis of the turrets extends normally, power driven mechanism for progressively turning said turrets step by step through a predetermined cycle, a heating medium supported between said turrets and interposed in a predetermined position between a corresponding pair of opposed shell holding members during at least a part of the cycle of turning of said turrets and mechanism synchronized with the turning of said turrets to successively move said opposing pairs of shell holding members into retracted spaced position, thereafter to relatively move the same towards one another in contact with said heating medium and thereafter to relatively move said pair together after travel thereof beyond the positioning of said heating medium to cause complementary heated edges of said shells to contact and to retain said shells in contact thereafter until complete fusion and cooling has occurred.

6. The structure set forth in claim 5 and said synchronized mechanism comprising a profile annular cam track mounted in a fixed relation adjacent one end of said mounting with the camming edge disposed inwardly and generally extending concentric with a circle defined by the longitudinal centers of said shell holding members and cam striker elements for riding said cam track connected respectively with the shell holding members of one of said turrets.

7. The structure set forth in claim 5 and said heating medium being swingably supported for reciprocation in substantially a vertical plane through a predetermined arc of the turning cycle of said turrets, means for urging said heating medium to an initial predetermined position, means for connecting said heating medium at its outer portion to said turrets to cause swinging of said heating medium through a predetermined arc by the turning of said turrets, means for releasing said connection means upon travel of said heating medium through said predetermined arc and means for cushioning the return movement of said heating medium.

8. The structure set forth in claim 5, said synchronized mechanism comprising a profile annular cam track mounted in a fixed relation adjacent one end of said mounting with the camming edge disposed inwardly and generally extending concentric with a circle defined by the longitudinal centers of said shell holding members and cam striker elements for riding said cam track connected respectively with the shell holding members of one of said turrets, and resilient means for urging the cam-operated set of said shell holding members inwardly to cause engagement between said cam striker elements and said cam track.

9. The structure set forth in claim 5, a pair of downwardly and inwardly directing guideways for delivering opposed pairs of shells to a receiving portion of said progressively turning turrets and a revoluble, shell-edge abutment disc interposed medially between said turrets at the receiving portion of the machine and journaled on an axis widely eccentric to the axis of said turrets and interposed between corresponding pairs of shells in said guides and extending throughout a portion thereof into a segment of the figure generated by said turrets.

10. Apparatus for uniting by fusing, a pair of thermoplastic sections which have complementary inter-engagement surfaces adapted to be brought into abutted registration, said apparatus comprising at least a pair of cooperating section mounting members constructed for movement together and apart, said section mounting members having means for precisely positioning and retaining sections to be joined with the complementary surfaces thereof disposed in opposed relation for registration, controllable mechanism for moving said section mounting members together and apart, a heating member adapted to simultaneously engage said complementary inter-engaging surfaces of said thermoplastic sections when said section mounting members are spaced apart, and mechanism for producing relative shifting movement between said heating member and said mounting members whereby said heating member is alternately positioned between a pair of opposed sections retained in said mounting members and removed therefrom.

11. Apparatus for manufacturing thin hollow bodies from a pair of thermoplastic shell members which have complementary edges adapted to be brought into registration, said apparatus having in combination a supporting structure, at least a pair of cooperating shell mounting members shiftably supported on said structure in connection therewith for movement together and apart, said shell mounting members being constructed to precisely position and retain shells of predetermined shape with the complementary edge surfaces thereof disposed in opposed relation for registration one against the other, controllable mechanism for moving said shell mounting members together and apart, a heating plate for engaging at least one of said complementary edges, and cam controlled actuating mechanism associated with said shell mounting members and said heating plate to produce synchronized relative movement therebetween transversely of the movements of said shell mounting members together and apart, said mechanism moving in sequence said shell mounting members inwardly toward each other to cause said heating plate then interposed between a pair of shells to be engaged by the complementary edges of said two shell edges disposed in opposed relation for subsequent registration, then moving said shell mounting members apart to disengage said shells from said heating plate then producing relative movement between said plate and said shells and then shifting said shell mounting members together to firmly press said opposed shell edges together for fusing and cooling.

12. Apparatus for fusing together complementary edges of a pair of plastic shells to form an integral hollow body, said apparatus having in combination a mounting, at least a pair of cooperating shell-holding members connected with said mounting in opposed relation for movement together and apart, said members having means for retaining a pair of said shells with their complementary edges disposed in opposition for registration, actuating mechanism cooperatively associated with said shell-holding members for moving said shell-holding members together and apart under control, a heating medium supported with respect to said mounting in a position to interpose heat between said complementary edges when said shell-holding members are spaced apart, control mechanism synchronized with said actuating mechanism for withdrawing said shell-holding members, then interposing said heating medium between said members for a predetermined short period, then removing said heating medium and thereafter moving said shell-holding members towards each other to press the opposed complementary edges of said shells together for fusing and subsequent cooling.

CLINTON V. CARLSON.
      WAYNE E. SCHOBER.

References Cited in the file of this patent

UNITED STATES PATENTS

| Number | Name | Date |
|---|---|---|
| 2,319,683 | Hofmann | May 18, 1943 |
| 2,448,173 | Cowan | Aug. 31, 1948 |